United States Patent
Kuhl et al.

(10) Patent No.: US 9,361,300 B2
(45) Date of Patent: Jun. 7, 2016

(54) CONTROLLING FILLING LEVELS OF STORAGE POOLS

(71) Applicant: INTERNATIONAL BUSINESS MACHINES CORPORATION, Armonk, NY (US)

(72) Inventors: Fabian Kuhl, Wiesbaden (DE); Christian Mueller, Dichtelbach (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/536,226

(22) Filed: Nov. 7, 2014

(65) Prior Publication Data

US 2015/0066864 A1 Mar. 5, 2015

Related U.S. Application Data

(63) Continuation of application No. 12/443,533, filed as application No. PCT/EP2007/056472 on Jun. 28, 2007, now Pat. No. 8,909,730.

(30) Foreign Application Priority Data

Oct. 18, 2006 (EP) .................................. 06122513

(51) Int. Cl.
*G06F 17/30* (2006.01)
*G06F 15/16* (2006.01)
*H04L 29/08* (2006.01)
*G06F 3/06* (2006.01)

(52) U.S. Cl.
CPC .... *G06F 17/30073* (2013.01); *G06F 17/30153* (2013.01); *G06F 17/30221* (2013.01); *H04L 67/1097* (2013.01); *G06F 3/0688* (2013.01)

(58) Field of Classification Search
CPC .................................................. G06F 17/30073
USPC .......................................................... 709/217
See application file for complete search history.

(56) References Cited

U.S. PATENT DOCUMENTS

| | | | |
|---|---|---|---|
| 5,367,698 A * | 11/1994 | Webber | G06F 17/30079 707/E17.01 |
| 5,832,522 A | 11/1998 | Blickenstaff et al. | |
| 6,067,599 A | 5/2000 | Kishi et al. | |
| 6,269,382 B1 * | 7/2001 | Cabrera | G06F 17/30082 |
| 2002/0069280 A1 * | 6/2002 | Bolik | G06F 17/30067 709/225 |
| 2007/0234107 A1 | 10/2007 | Davison | |

FOREIGN PATENT DOCUMENTS

EP   1215590 A2   6/2002

\* cited by examiner

*Primary Examiner* — Suraj Joshi
(74) *Attorney, Agent, or Firm* — Griffiths & Seaton PLLC

(57) ABSTRACT

Method, system, and computer program product embodiments of controlling filling levels of a plurality of storage pools are provided. A plurality of files is selected from each storage pool of the plurality of storage pools. Each file is then copied to a server and a list is updated. The list comprises an entry for each file of the plurality of files. Each entry comprises a status information. The status information indicates that the corresponding file has been copied to the server. Each entry further comprises an identifier indicating the storage pool on which the corresponding file is stored. If it is detected that the filling level of a storage pool reaches a predefined first threshold value, then a first set of files is determined by use of the list. Each file of the first set of files is replaced by a stub file. The status information is updated.

20 Claims, 4 Drawing Sheets

# CONTROLLING FILLING LEVELS OF STORAGE POOLS

CROSS-REFERENCE TO RELATED APPLICATIONS

This application is a continuation of U.S. patent application Ser. No. 12/443,533, now U.S. Pat. No. 8,909,730, filed on Mar. 30, 2009, which is U.S. National-Stage entry under 35 U.S.C. §371 based on International Application No. PCT/EP2007/056472, filed Jun. 28, 2007, which was published under PCT Article 21(2) and which claims priority to EP Patent Application No. 06122513.2 filed on Oct. 18, 2006.

TECHNICAL FIELD

The invention relates to a method of controlling filling levels of a plurality of storage pools, to a computer program product for controlling the filling levels of a plurality of storage pools, and to a data processing system for controlling filling levels of the plurality of storage pools.

BACKGROUND

A storage pool is a collection of discs, redundant arrays of inexpensive discs (RAIDs), or other storage devices that have similar properties. A plurality of storage pools can be managed by a file system. A file system can be seen as a method for storing and organizing files and the data they contain on each storage pool of the plurality of storage pools so that the files and the data can be, e.g., retrieved from the storage pools.

A file system can manage and organize files on the storage pools by use of so called policies. A policy is a set of rules that specifies how a file is to be handled. For example, a so called placement policy could specify that all newly created files are to be placed to a first storage pool of the plurality of storage pools, wherein the first storage pool is the storage pool which provides the highest access rate of all storage pools of the plurality of storage pools. If a new file is created, then the new file is based on the above mentioned placement policy assigned to the first storage pool and all data written to the file is stored on the first storage pool.

Another so called management policy can further determine that newly created files are migrated from the first storage pool to a second storage pool of the plurality of storage pools if these files match to the criteria given by the policy e.g. are not accessed for the period of a month.

A hierarchical storage management (HSM) system can be further used to manage the file system associated with a plurality of storage pools. The hierarchical storage management system can for example be employed to monitor the filling level of the file system. The filling level of the file system refers to the relative amount of storage space occupied by the file system on the storage pools with respect to the total storage space provided by the plurality of storage pools.

If the HSM system detects for example that the filling level reaches an out of space condition (ENOSPACE) which corresponds to a filling level of 100%, the HSM system starts migrating the old and large files from the storage pools to a server system that is connected to the storage pools and substitutes the original files through a smaller stub file. A stub file is a very small file which is a pointer to the original file on the server. The storage system can for example provide cheap storage devices such as tapes so that the migrated data is stored in a cheap manner.

An individual storage pool of the plurality of storage pools might however reach the out of space condition long before the file system or correspondingly the plurality of storage pools reach the out of space condition. As the HSM system only controls the filling levels of the file system, it is not able to detect when an individual storage pool reaches the out of space condition. For example, if the first storage is full with data, the above mentioned placement policy does not work anymore, and in the worst case, when no default placement policy is defined, no new files that match to that placement policy can be created on the file system as there is no storage space available anymore on the first storage pool while there might still be lots of storage space available on the second storage pool keeping the filling level of the file system for away from the out of space condition.

There is therefore a need for an improved method and data processing system for controlling filling levels of each storage pool of a plurality of storage pools.

SUMMARY OF THE INVENTION

In accordance with an embodiment of the invention, there is provided a method of controlling the filling levels of a plurality of storage pools, wherein an identifier has been assigned to each storage pool of the plurality of storage pools, and wherein the method in accordance with the invention comprises the step of selecting a plurality of files from the plurality of storage pools. Each file of the plurality of files is then copied to a server. A list is further updated which comprises an entry for each file of the plurality of files, wherein each entry comprises a status information, wherein the status information indicates that the corresponding file has been copied to the server. Each entry of a file further comprises the identifier of the storage pool on which the corresponding file is stored. If the filling level of a storage pool is detected to reach a predefined first threshold value, then a first set of files is determined by selecting files from the list for which the status information in the corresponding entries indicate that the files have been already copied to the server and for which the corresponding identifiers in the entries correspond to the identifier of the storage pool. Furthermore, on the storage pool whose filling level reached the first threshold value, each file of the first set of files is then replaced by a stub file and the status information comprised in the entries of the files of the first set of files is updated, wherein the updated status information indicates that the files have now been replaced by stub files.

A plurality of files is thus chosen from the files stored on the storage pools. Each file of the plurality of files is pre-migrated (copied) to the server which is connected with the storage pools. The list which can comprise an entry for each file stored on the storage pools is updated such that the entries of the files that have been pre-migrated to the server now comprise a status information that indicates that the corresponding file has been copied to the server. The status information further indicates on which of the storage pools the files are stored by use of the identifiers that have been assigned to each storage pool. The first set of files which comprises some or all files stored on the storage pool for which the filling level reaches the predefined first threshold value and which have been pre-migrated before to the server is then determined. The files comprised in the first set of files are replaced by stub files and the status information relating to these files are updated accordingly.

Only files that have been pre-migrated before are comprised in the first set of files. Thus, when the filling level of the corresponding storage pool reaches the predefined first threshold value, the corresponding files of the first set of files must only be replaced by stub files in order to free the storage space that is consumed by these files. As they have been copied before to the server, the process of moving the data of these files can be saved. This provides the advantage that the filling level of the storage pool that reaches the predefined first threshold value can be reduced quickly as the transfer of data to the server has been done before.

In accordance with an embodiment of the invention, the storage space consumed by the files selected from each storage pool is larger than a preset second threshold value. The second threshold value can for example be specified by an administrator of the storage pools. The specification of the second threshold value ensures that files covering at least the second threshold value of storage space will pre-migrated with respect to each storage pool.

In accordance with an embodiment of the invention, the storage space consumed by the first set of files is larger than a preset third threshold value. The third threshold value can also be specified by an administrator of the storage pools, and the third threshold value is smaller than the second threshold value. The third threshold value specifies the minimum storage space consumed by the first set of files. The requirement that the first set of files must at least consume the third threshold value of storage space ensures that the storage space corresponding approximately to the third threshold value can be freed when the first set of files are replaced by stub files (the stub files consume a small amount of storage space as they do not contain more then the file name and a few attributes of the corresponding original files).

The first threshold value can therefore relate to a high threshold value. If the filling level of the storage space reaches the high threshold value, then the files of the corresponding first set of files are changed into stub files. The third threshold value which relates to the amount of storage space used by the first set of files can therefore be set to a value so that the filling level of the storage space drops to a low threshold value. Hence, the third threshold value corresponds to the difference between the high and low threshold value. The second threshold value specifies the storage space occupied by the files that are pre-migrated from the corresponding storage space. The second threshold value is thereby larger than third threshold value. As the second threshold value is larger than third threshold value, it is ensured that more files are pre-migrated then required in order to ensure that the filling level can be quickly reduced to the low threshold value in case the high threshold value is reached.

In accordance with an embodiment of the invention, the files of the plurality of files are selected by use of a given set of rules or by use of a plurality of given sets of rules. The selection of the plurality of files can be based on at least one given set of rules, which might be specified by the system administrator. A set of rule is also denoted as policy. For example, the administrator can specify that at first all ".mpeg"-files are selected, then all ".wav"-files, and then all ".doc"-files, and so on until enough files have been selected from each storage space so that the storage space consumed by the files selected from each storage pool is larger than a preset second threshold value. The usage of policies provides the advantage that the system administrator can determine which files are pre-migrated first. The system administrator is thus able to adapt the method in accordance with the invention in a flexible way to the needs of the data processing system she/he is supervising.

In accordance with an embodiment of the invention, the first threshold value corresponds to a out of space condition for the storage pool. The out of space condition corresponds to a storage pool filling level of 100%.

In accordance with an embodiment of the invention, the storage pools are interconnected with a policy engine, wherein the policy engine is further linked with a storage management system, wherein the policy engine determines the plurality of files from the plurality of storage pools, wherein the policy engine provides the object-ID of each file of the plurality of files to the storage management system, wherein the storage management system is adapted to update the list and to copy each file of the plurality of files to a server. The storage management system further monitors the plurality of storage pools and, if the filling level of a storage pool is detected to reach the first threshold value, the storage management system replaces the files of the first set of files by stub files and updates the list.

In another aspect, the invention relates to a computer program product for controlling filling levels of a plurality of storage pools, wherein the computer program product comprises computer executable instructions, and wherein the instructions are adapted to perform the steps of selecting a plurality of files of each storage pool of the plurality of storage pools by use of a given set of rules. The instructions are further adapted to provide the object-ID of each file of the plurality of files via an interface to another computer program product that is further adapted to control the filling level of the plurality of storage pools.

In another aspect, the invention relates to a computer program product for controlling filling levels of the plurality of storage pools, wherein the computer program product comprises computer executable instructions. The instructions are adapted to perform the step of receiving the file names of each file of a plurality of files, wherein the plurality of files is stored on the plurality of storage pools, wherein each storage pool of the plurality of storage pools has assigned an identifier. The instructions are further adapted to perform the step of copying each file of the plurality of files to a server, and the step of updating a list. The list comprises an entry for each file of the plurality of files, wherein each entry comprises a status information, wherein the status information indicates that the corresponding file has been copied to the server, and wherein each entry further comprises the identifier of the storage pool on which the corresponding file is stored. In a further step, the filling level of a storage pool is detected to have reached a predefined first threshold value. In response to the above mentioned detection, a first set of files is determined by use of the list, wherein the first set of files comprises files for which the status information in the corresponding entries indicate that the files have been copied to the server and for which the corresponding identifiers in the entries correspond to the identifier of the storage pool. Furthermore, the instructions are adapted to perform the step of replacing each file of the first set of files on the storage pool by a stub file and of updating the status information comprised in the entries for the files of the first set of files, wherein the updated status information indicates that the files have been replaced by stub files.

In another aspect, the invention relates to a data processing system for controlling filling levels of a plurality of storage pools, wherein an identifier is assigned to each storage pool of the plurality of storage pools, and wherein the data processing system comprises means for selecting a plurality of files from the plurality of storage pools and means for copying each file of the plurality of files to a server. The data processing system also has means for updating a list, wherein the list comprises an entry for each file of the plurality of files and wherein each entry comprises a status information, wherein the status information indicates that the corresponding file has been copied to the server. Each entry further comprises an identifier, wherein the identifier indicates the storage pool on which the corresponding file is stored. The data processing system further comprises means for monitoring the filling level of each storage pool and means for determining a first set of files by use of the list, if the filling level of a storage pool is detected to reach a predefined first threshold value. The first set of files comprises files for which the status information in the corresponding entries indicate that the files have been copied to the server and for which the corresponding identifiers in the entries correspond to the identifier of the storage pool. Means for replacing each file of the first set of files on the storage pool by a stub file are further comprised in the data processing system. Additionally, the data processing system has means for updating the status information comprised in the entries for the files of the first set of files, wherein the updated status information indicates that the files have been replaced by stub files.

BRIEF DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
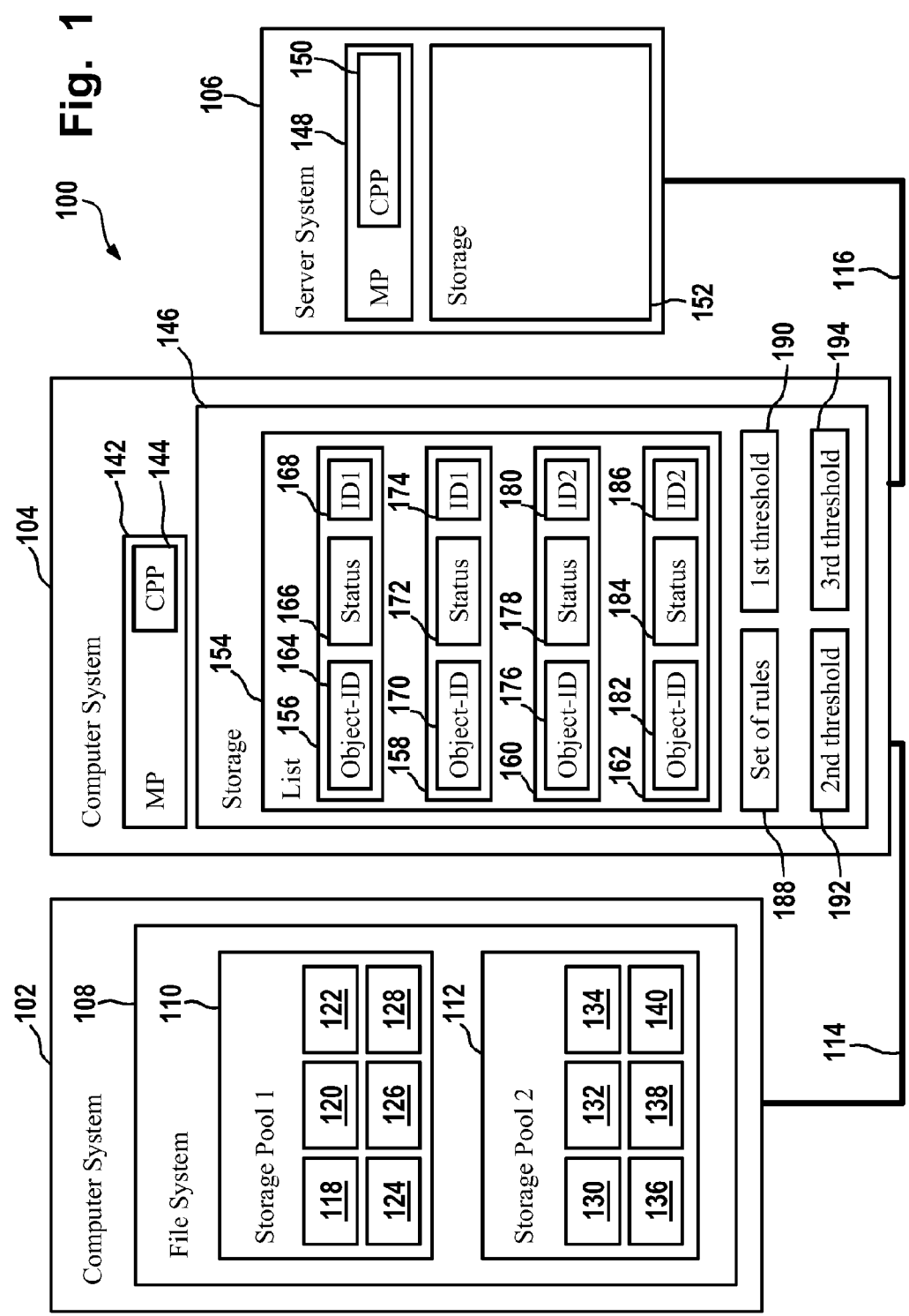
FIG. 1 shows a block diagram of a data processing system.

FIG. 1 shows a block diagram of a data processing system 100. The data processing system 100 comprises a computer system 102, a computer system 104, and a server system 106. The computer system 102 comprises a first storage pool 110 and a second storage pool 112. The first storage pool 110 holds files 118, 120, 122, 124, 126, and 128. The second storage pool 112 holds files 130, 132, 134, 136, 138, 140. Each of the first and second storage pools 110 and 112 comprises one or more storage devices, so that the above mentioned files 118, . . . , 140 are stored on a storage device of the corresponding storage pools 110 or 112. The files 118, . . . , 140 are organized in a file system 108 as indicated by the rectangle surrounding the first and second storage pools 110 and 112.

The computer system 102 can further comprise a microprocessor, a screen, and an input device (not shown in FIG. 1) so that a user is able to work directly on the computer system 102.

The computer system 104 comprises a microprocessor 142 and a storage device 146. The server system 106 also comprises a microprocessor 148 and a storage device 152. The storage device 152 can be a mass storage device or a mass storage system that allows for the storing of a large amount of data in a cost efficient way.

The computer system 102 is furthermore connected to the computer system 104 via connection 114. The computer system 104 is connected via connection 116 to the server system 106. The connections 114 and 116 can for example be high speed local area network connections. The microprocessor 142 of the computer system 104 executes a computer program product 144 which is, e.g., stored on the storage device 146 from where it is loaded into the processor 142 after the computer system 104 has been started up. The computer program product 144 is employed to control the filling levels of the first storage pool 110 and the second storage pool 112 and is therefore able to access the storage pools 110 and 112 via connection 114.

In operation, the computer program product 144 selects a plurality of files of each of the first and second storage pools 110 and 112. For example, the computer program product 144 selects the files 118 and 120 from the files 118, . . . , 128 stored on the first storage pool 110 and the files 130 and 132 from the files 130, . . . , 140 stored on the second storage pool 112. Each of the files 118, 120, 130, and 132 is copied to the server system 106. That is, a copy of each of the files is transferred via connection 114 and connection 116 to the server system 106, where the copies are received by a second computer program product 150 executed by the microprocessor 148.

The second computer program product 150 can be loaded from the storage 152 during the startup phase of the server system 106, whereby the computer program product 150 is permanently stored on the storage device 152. The second computer program product 150 takes account of the storage of the copies of the files 118, 120, 130, and 132 on the storage device 152.

The computer program product 144 further has access to a list 154 stored on the storage device 146. The list comprises an entry 156, 158, 160, 162 for each of the files 118, . . . , 140. In the case it does not comprise an entry for a file, the computer program product 144 generates a corresponding entry. The entry 156 relates thereby to the file 118 and comprises the object IDs 164 of the file 118, a status information 166, and an identifier 168. The object ID 164 is an unique identification for the corresponding file 118. The status information 166 is updated after the copying of the file 118 to server system 106 so that the status information 164 indicates that a copy exists for the file 118 on the server system 106. The identifier 168 further indicates that the file 118 is stored on the first storage pool 110 as the identifier 168 is associated with the first storage pool 110.

Accordingly, the entry 158 comprises the object ID 170 of the file 120, a status information 172 which is updated so that it indicates that the file 120 has been copied to server system 106, and an identifier 174 which indicates that the file 120 is stored on the storage pool 110.

Furthermore, the entry 160 comprises the object ID 176 of the file 130, a status information 178 which is updated so that indicates that the file 130 has been copied to server system 106, and an identifier 180 which indicates that the file 130 is stored on the storage pool 112.

The entry 162 comprises object ID 182 of the file 132, a status information 184 which is updated so that it indicates that the file 132 has been copied to server system 106, and an identifier 186 which indicates that the file 132 is stored on the second storage pool 112.

A first threshold value 190 is stored on the storage device 146 which can be read out by the computer program product 144. The first threshold value can be specified, e.g., by a system administrator of the data processing system 100. The first threshold value specifies the maximum allowed filling level for the first and second storage pool 110 and 112.

If, e.g., the filling level of the first storage pool 110 is detected by the computer program product 144 to reach the first threshold value, then the list 154 is scanned for the files that have been copied to the server system 106 and that are still stored on the storage pool 110. These files can be found by analyzing the status information and identifiers of the entries 156, ..., 162. Thus, the files 118 and 120 are identified to fulfill the condition. A first set of files is then determined from the files 118 and 120 which might for example only comprise file 120. The file 120 of the first set of files is then replaced by a stub file so that the filling level of the first storage pool 110 drops. The status information in the entry 156 relating to the file 120 is then updated so that the status information 166 indicates that the file 120 has been replaced by a stub file.

A second threshold value 192 and a third threshold value 194 can further be stored on the storage device 146 from where they are accessible for the computer program product 144. Both, the first threshold value 190 and the second threshold value 192 can be specified by the system administrator. The second threshold value 192 thereby specifies the minimum amount of storage space consumed by the files that are selected from each storage pool. Thus, the files 118 and 120 consume in total at least the storage space specified by the second threshold value 192 and the same holds for the storage space consumed by the files 130 and 132.

The third threshold value 194 specifies the amount of storage space consumed by the first set of files. That is, the file 118, being according to the example given above, the only file in the first set of files, consumes a storage space which is larger than the third threshold value 194. The third threshold value 194 must therefore always be lower than the second threshold value 192.

Generally, many files (not only files 118 and 120) are pre-migrated (copied) to the server system 106. The first set of files corresponds to a selection that has been picked from the pre-migrated files. Due to the requirement that the first set of files occupies at least the third threshold value 194 of storage space, it is ensured that approximately this amount of storage space is freed when the files of the first set of files are replaced by stubs.

Furthermore, a set of rules 188 can be specified, e.g., also by the system administrator. The set of rules 188 is also stored on the storage device 146 where it is also accessible for the computer program product 144. The set of rules 188 refers to one or more policies according to which the plurality of files is selected from the first and second storage pool 110, 112. For example, the set of rules 188 could specify that at first all 'MPEG'-files are selected, then, all 'VIP'-files, and then other file types. The set of rules 188 can also alternatively or in addition to the above mentioned policy specify that the largest and oldest files are picked first.

Figure 2:
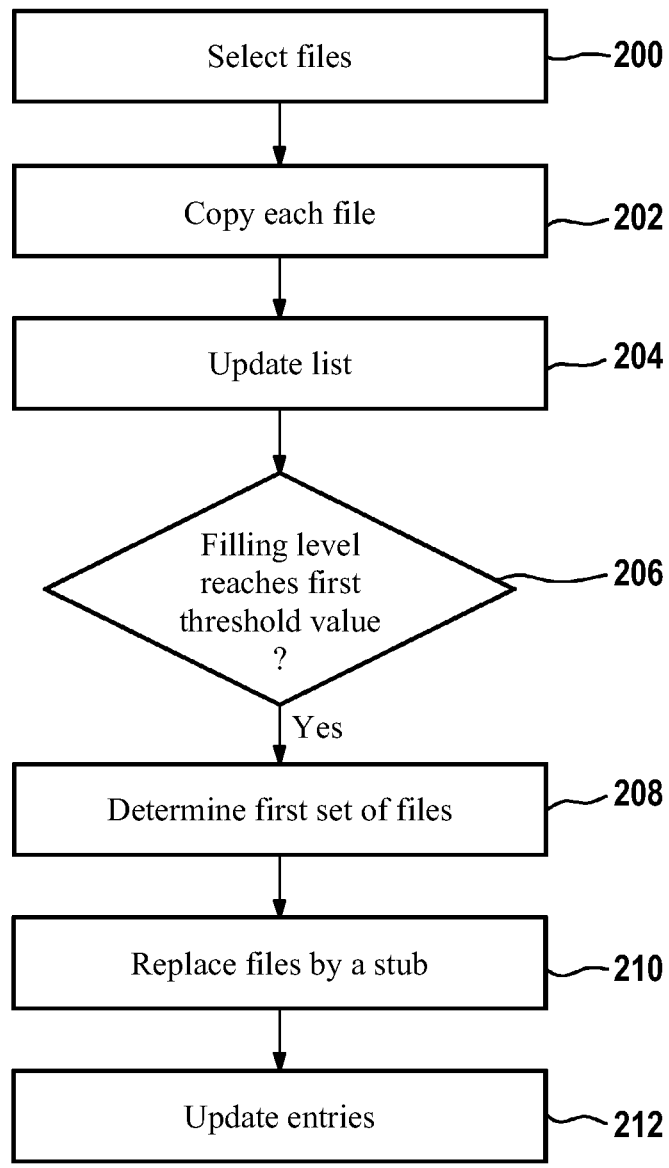
FIG. 2 shows a flow diagram illustrating basic steps performed by a method in accordance with the invention.

FIG. 2 shows a flow diagram illustrating basic steps performed by a method in accordance with the invention. In step 200, a plurality of files is selected from each storage pool of a plurality of storage pools. In step 202 each file of the plurality of files is copied to a server. In step 204 the list is updated. The list comprises an entry for each file of the plurality of files. Each entry comprises a status information which indicates that the corresponding file has been copied to the server. Furthermore, each entry comprises an identifier which indicates the storage pool on which the corresponding file is stored. In step 206 it is detected that the filling level of a storage pool of the plurality of storage pools reaches a pre-defined first threshold value. Then, in step 208, a first set of files is determined by use of the list, wherein the first set of files comprises files for which the status information in the corresponding entries indicate that the files have been copied to the server and for which the corresponding identifiers in the entries correspond to the identifier of the storage pool whose filling level has been detected in step 206 to reach the first threshold value. In step 210, each file on the storage pool that is comprised in the first set of files is replaced by a stub file. Furthermore, in step 212 the status information comprised in the entries for the files of the first set of files is updated, wherein the updated status information indicates that these files have been replaced by stub files.

Figure 3:
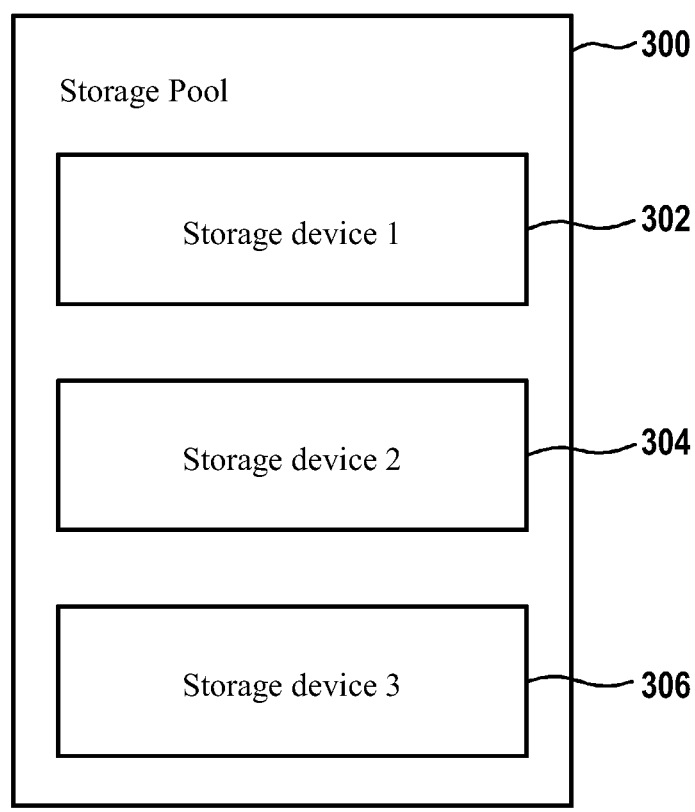
FIG. 3 shows a block diagram of a storage pool.

FIG. 3 shows a block diagram of a storage pool 300. The storage pool 300 comprises a first storage device 302, a second storage device 304, and a third storage device 306. The first, second and third storage devices 302, 304, and 306 have similar properties and they are managed usually as an entity. The available storage space on the storage pool 300 corresponds to the sum of the storage spaces provided by the first, second and third storage devices 302, 304, and 306. The first threshold value can, e.g., refer to a specific percentage of the total storage space used. For example, the first threshold value can relate to 70% of the total storage space provided by the storage pool 300. Alternatively, the first threshold value can relate to an out of space condition, which corresponds to 100% of the total storage space being occupied by files.

Figure 4:
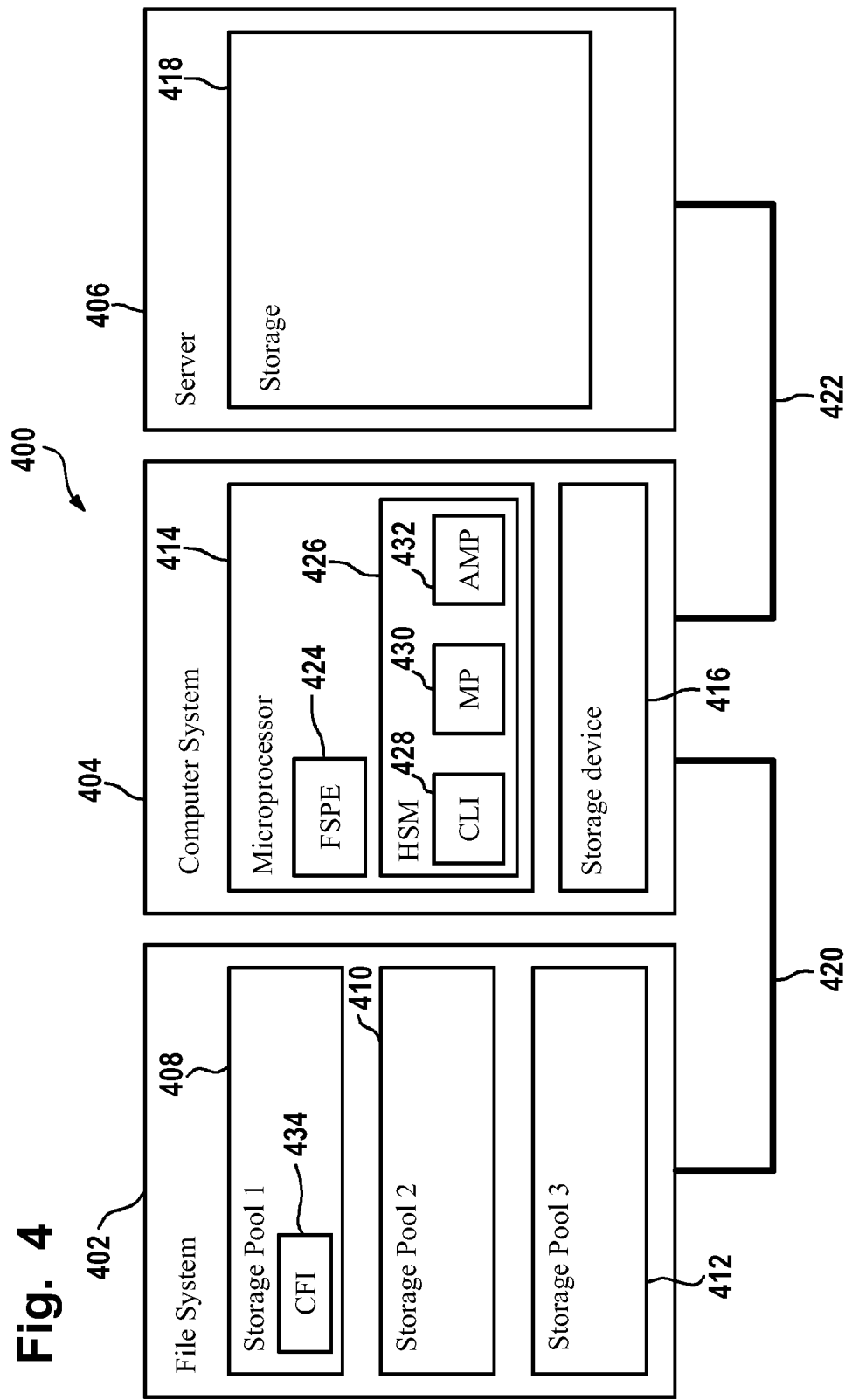
FIG. 4 shows a block diagram of another data processing system.

FIG. 4 shows a block diagram of a data processing system 400. The data processing system 400 comprises a first, second, and third storage pool 408, 410 and 412. The first, second and third storage pool 408, 410 and 412 relate to a file system 402. All storage pools are, e.g., hosted by a computer system 402 (cf. FIG. 1) or distributed among various computer systems.

The data processing system 400 further comprises a computer system 404 and a server system 406. The computer system 404 comprises a microprocessor 414 and a storage device 416. The server 406 also comprises a storage device 418.

The file system 402 which might be distributed among several computer systems can be accessed by the computer system 404 via network connection 420. The computer system 404 and the server system 406 are also connected via network connection 422. Files stored on the storage pools 408, 410, 412 can thus be transferred from the file system 402 to the server system 406 via the connections 420 and 422.

The microprocessor 414 executes a file system policy engine (FSPE) 424, and a hierarchical storage manager (HSM) 426. The hierarchical storage manager 426 comprises a command line interface (CLI) 428, a monitor process (MP) 430, and an auto migration process (AMP) 432.

The policy engine 424 and the hierarchical storage manager 426 are permanently stored, e.g., on the storage device 416 and loaded into the microprocessor 414, e.g., during the startup phase of the computer system 404.

In operation, the file system policy engine 424 determines a plurality of files from each storage pool 408, 410, and 412. The object-IDs relating to the files are provided by the policy engine 424 via the command line interface 428 to the hierarchical storage manager 426.

In response to the reception of the object IDs, the hierarchical storage manager 426 pre-migrates the files from the storage pools to the storage 418. In addition, the hierarchical storage manager 426 maintains a so called complete file index (CFI) 434, which is stored on the storage pool 408. The complete file index 434 comprises an entry for each file stored on the storage pools 408, 410 and 412. The complete file index 434 is updated so that the entries for the files that have been pre-migrated before comprise a status information that indicates that these files have been copied to the server 418. Each entry further comprises an identifier that indicates the storage pool on which the corresponding files are stored.

The monitor process 430 continually monitors the filling levels of the storage pools 408, 410 and 412. If the filling level of one of the storage pools reaches a predefined first threshold value, then a first set of files is determined by use of the complete file index 434. The hierarchical storage manager 426 therefore searches through the complete file index 434 and determines all files that have been pre-migrated before to the storage 408 and that are still stored on the storage pool which has been detected to reach the first threshold value. Some or all files that are determined by the above mentioned scanning of the complete file index 434 are assigned to the first set of files. The files held in the first set of files are replaced by stub files. By use of the auto migration process 432, the complete file index 434 is updated accordingly.

In the subsequent claims, reference numerals have been incorporated in order to facilitate an understanding of the claims. Any reference in the claims shall however not be construed as limiting the scope.

The invention claimed is:

1. A method for controlling filling levels of a plurality of storage pools, each storage pool comprising a plurality of files, using a processor device in a computing system including a first computing device storing the plurality of storage pools, a second computing device in communication with the first storage device and storing a list including size information corresponding to each storage pool and to size information and type of data in each file in each storage pool, and a server in communication with the first computing device and the second computing device, said method comprising:
   providing a first threshold value for each respective storage pool representing a predefined maximum storage amount;
   monitoring an associated filling level of each respective storage pool as each file in each storage pool is copied to the server;
   if the filling level of a particular storage pool reaches a corresponding particular first threshold value:
      searching the particular storage pool to determine which files are copied to the server,
      determining, via the list, a type of data of each file that is copied to the server, and
      selecting a first set of files in the particular storage pool based on the type of data and an amount of free space needed to reduce the associated filling level below the corresponding particular first threshold value to store a new set of files; and
   replacing each file in the selected first set of files with a respective stub file for freeing the needed storage space in the respective storage pool such that the associated filling level is less than the corresponding particular first threshold value and such that the new set of files may be stored therein, wherein all of a first type of data is selected and replaced before any of a second type of data is selected and replaced based on a priority policy.

2. The method of claim 1, further comprising updating said list to indicate new size information corresponding to the particular storage pool and further indicating that each file in the selected first set of files has been replaced by a respective stub file.

3. The method of claim 1, wherein determining the first set of selected files comprises:
   determining a minimum size sufficient to decrease the associated filling level below the corresponding particular first threshold value; and
   basing the selection of the selected first set of files on the determined minimum size.

4. The method of claim 3, wherein the determined minimum size is a second threshold value and the selection of each file in the selected first set of files comprises selecting files with a combined size sufficient to exceed the second threshold value.

5. The method of claim 4, wherein selecting the files comprises:
   determining a respective size of each file in the particular storage pool, each respective size representing an associated third threshold value that is less than the second threshold value; and
   accumulating each selected file to obtain the selected first set of files such that a combined value of the accumulated third threshold values is greater than the second threshold value.

6. The method of claim 1, wherein said plurality of storage pools is linked with a policy engine, wherein said policy engine determines said plurality of selected files from said plurality of storage pools, wherein said policy engine provides an object-ID of each file of the plurality of selected files via a command line interface to a storage management system, wherein said command line interface is a component of said storage management system, wherein said storage management system updates said list and copies each selected file of said set of selected files to the server, wherein said storage management system further monitors the plurality of storage pools and if the filling level of said one storage pool reaches the first threshold value, the storage management system replaces each file in said first set of selected files with a stub file and updates the list.

7. The method of claim 1, wherein the first threshold value corresponds to an out of space condition.

8. A computer program product for controlling filling levels of a plurality of storage pools using a processor device in a computing system including a first computing device storing the plurality of storage pools, a second computing device in communication with the first storage device and storing a list including size information corresponding to each storage pool and to size information and type of data in each file in each storage pool, and a server in communication with the first computing device and the second computing device, said computer program product including a computer-readable memory comprising:
   computer code for providing a first threshold value for each respective storage pool representing a predefined maximum storage amount;
   computer code for monitoring an associated filling level of each respective storage pool as each file in each storage pool is copied to the server;
   computer code for determining if the filling level of a particular storage pool reaches a corresponding particular first threshold value, and in response thereto:
      computer code for searching the particular storage pool to determine which files are copied to the server,
      computer code for determining, via the list, a type of data of each file that is copied to the server, and
      computer code for selecting a first set of files in the particular storage pool based on the type of data and an amount of free space needed to reduce the associated filling level below the corresponding particular first threshold value to store a new set of files; and
   computer code for replacing each file in the selected first set of files with a respective stub file for freeing the needed storage space in the respective storage pool such that the associated filling level is less than the corresponding particular first threshold value and such that the new set of files may be stored therein, wherein all of a first type of data is selected and replaced before any of a second type of data is selected and replaced based on a priority policy.

9. The computer program product of claim 8, further comprising computer code for updating said list to indicate new size information corresponding to the particular storage pool and further indicating that each file in the selected first set of files has been replaced by a respective stub file.

10. The computer program product of claim 9, wherein the determined minimum size is a second threshold value and the computer code for selecting each file in the selected first set of files comprises computer code for selecting files with a combined size sufficient to exceed the second threshold value.

11. The computer program product of claim 10, wherein computer code for selecting the files comprises:
   computer code for determining a respective size of each file in the particular storage pool, each respective size representing an associated third threshold value that is less than the second threshold value; and
   computer code for accumulating each selected file to obtain the selected first set of files such that a combined value of the accumulated third threshold values is greater than the second threshold value.

12. The computer program product of claim 8, wherein the computer code for determining the first set of selected files comprises:
   computer code for determining a minimum size sufficient to decrease the associated filling level below the corresponding particular first threshold value; and
   computer code for basing the selection of the selected first set of files on the determined minimum size.

13. The computer program product of claim 8, wherein said plurality of storage pools is linked with a policy engine, wherein said policy engine determines said plurality of selected files from said plurality of storage pools, wherein said policy engine provides an object-ID of each file of the plurality of selected files via a command line interface to a storage management system, wherein said command line interface is a component of said storage management system, wherein said storage management system updates said list and copies each selected file of said set of selected files to the server, wherein said storage management system further monitors the plurality of storage pools and if the filling level of said one storage pool reaches the first threshold value, the storage management system replaces each file in said first set of selected files with a stub file and updates the list.

14. A computing system for controlling storage pool filling levels, comprising:
   a first computing device storing a plurality of storage pools, each storage pool comprising a plurality of files;
   a second computing device in communication with the first storage device and storing a list including size information corresponding to each storage pool and to size information and type of data in each file in each storage pool; and
   a server in communication with the first computing device and the second computing device; and
   a processor device operable with the first computing device, the second computing device, and the server wherein the processor device is configured for:
      providing a first threshold value for each respective storage pool representing a predefined maximum storage amount,
      monitoring an associated filling level of each respective storage pool as each file in each storage pool is copied to the server,
      determining if the filling level of a particular storage pool reaches a corresponding particular first threshold value, and in response thereto:
         searching the particular storage pool to determine which files are copied to the server,
         determining, via the list, a type of data of each file that is copied to the server,
         selecting a first set of files in the particular storage pool based on the type of data and an amount of free space needed to reduce the associated filling level below the corresponding particular first threshold value to store a new set of files, and
         replacing each file in the selected first set of files with a respective stub file for freeing storage space in the respective storage pool such that the associated filling level is less than the corresponding particular first threshold value and such that a new set of files may be stored therein, wherein all of a first type of data is selected and replaced before any of a second type of data is selected and replaced based on a priority policy.

15. The computing system of claim 14, wherein the processor device is further configured for updating said list to indicate new size information corresponding to the particular storage pool and further indicating that each file in the selected first set of files has been replaced by a respective stub file.

16. The computing system of claim 14, wherein when determining the first set of selected files the processor device is configured for:
   determining a minimum size sufficient to decrease the associated filling level below the corresponding particular first threshold value; and
   basing the selection of the selected first set of files on the determined minimum size.

17. The computing system of claim 16, wherein the determined minimum size is a second threshold value and wherein when selecting each file in the selected first set of files the processor device is configured for selecting files with a combined size sufficient to exceed the second threshold value.

18. The computing system of claim 17, wherein when selecting the files processor device is configured for:
   determining a respective size of each file in the particular storage pool, each respective size representing an associated third threshold value that is less than the second threshold value; and
   accumulating each selected file to obtain the selected first set of files such that a combined value of the accumulated third threshold values is greater than the second threshold value.

19. The computing system of claim 14, wherein said plurality of storage pools is linked with a policy engine, wherein said policy engine determines said plurality of selected files from said plurality of storage pools, wherein said policy engine provides an object-ID of each file of the plurality of selected files via a command line interface to a storage management system, wherein said command line interface is a component of said storage management system, wherein said storage management system updates said list and copies each selected file of said set of selected files to the server, wherein said storage management system further monitors the plurality of storage pools and if the filling level of said one storage pool reaches the first threshold value, the storage management system replaces each file in said first set of selected files with a stub file and updates the list.

20. The computing system of claim 14, wherein the first threshold value corresponds to an out of space condition.

* * * * *